Feb. 19, 1952  J. A. WOODS  2,586,495
COMBINATION BABY BOUNCER AND BABY CARRIAGE
Filed June 14, 1949  2 SHEETS—SHEET 1
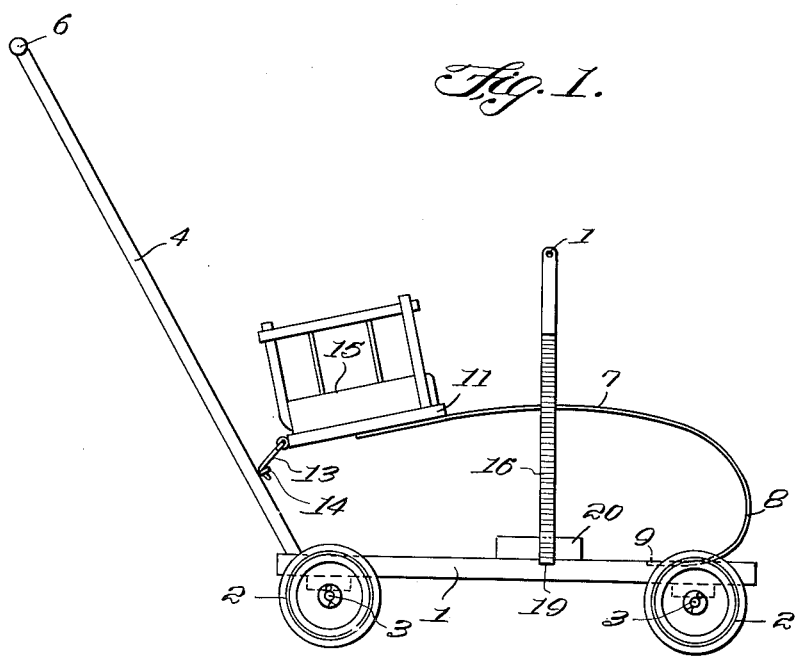
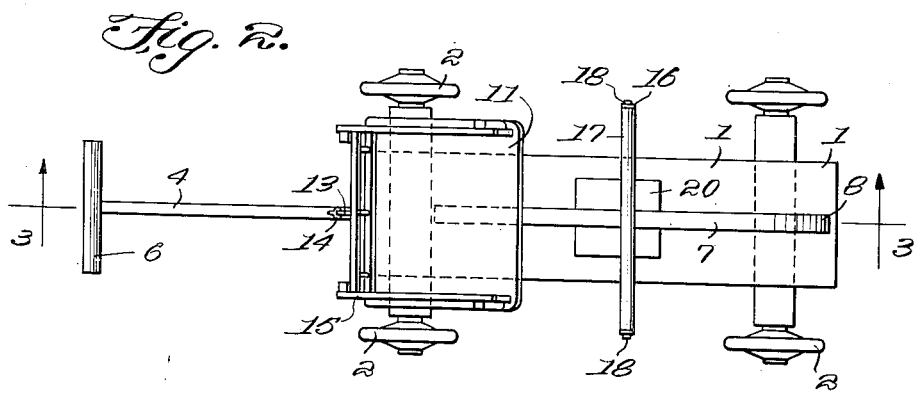
INVENTOR.
James A. Woods,
BY Victor J. Evans & Co.
ATTORNEYS Feb. 19, 1952     J. A. WOODS     2,586,495
COMBINATION BABY BOUNCER AND BABY CARRIAGE
Filed June 14, 1949     2 SHEETS—SHEET 2
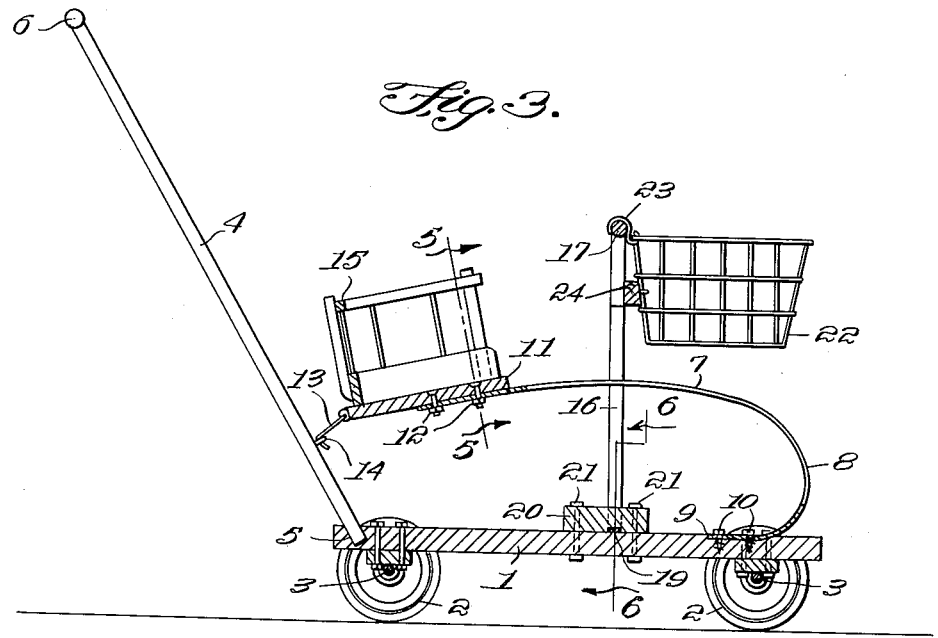
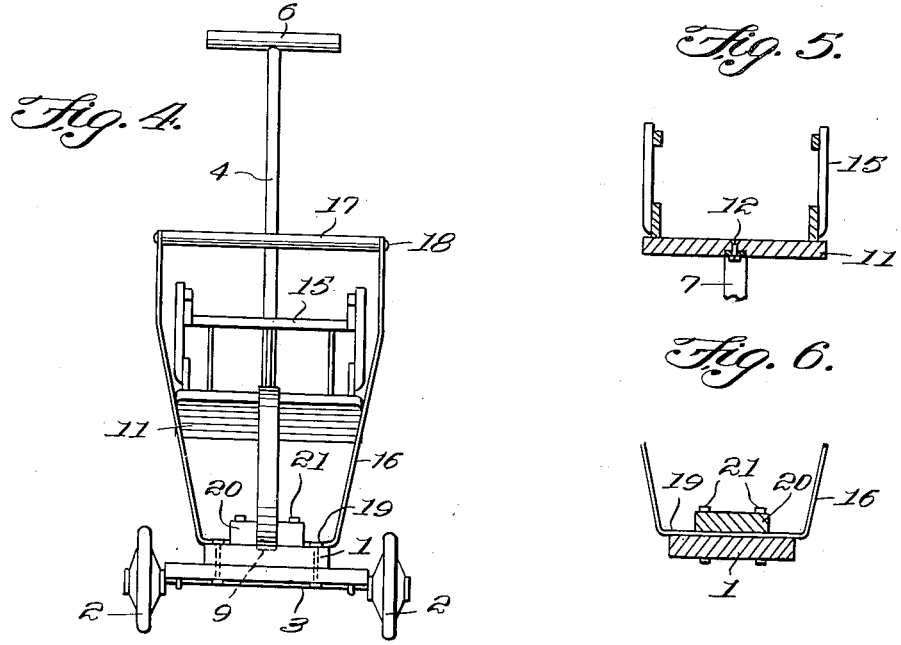
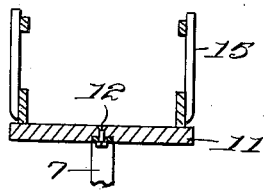
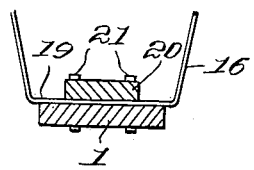
INVENTOR.
James A. Woods,
BY Victor J. Evans & Co.
ATTORNEYS Patented Feb. 19, 1952

2,586,495

UNITED STATES PATENT OFFICE 2,586,495

COMBINATION BABY BOUNCER AND BABY CARRIAGE

James Alfred Woods, Richmond, Calif.

Application June 14, 1949, Serial No. 98,930

5 Claims. (Cl. 155—41)

My present invention relates to the general class of amusement and exercising devices, embodied in a convertible baby carriage and baby jumper, and more specifically to an improved baby bouncer of the leaf spring type that may selectively be employed as a four wheel outdoor stroller and baby carriage, and means are employed whereby the baby carriage may be readily converted for both outdoor and indoor use as an exercising and amusement device.

The appliance of my invention includes a minimum number of standardized parts that may with facility be manufactured with low cost of production, and the parts may be assembled with convenience to insure a light-weight but strong and durable structure that may readily be converted for different purposes and uses. The invention consists in certain novel features of construction and combinations and arrangements of parts as will hereinafter be described and more particularly set forth in the appended claims.

In the accompanying drawings I have illustrated a complete example of a physical embodiment of my invention in which the parts are combined and arranged in accord with one mode I have thus far devised for the practical application of the principles of my invention. It will be understood that changes and alterations are contemplated and may be made in these exemplifying drawings and mechanical structures, within the scope of my claims, without departing from the principles of the invention.

Figure 1 is a view in side elevation of a baby carriage or stroller in which the invention is physically embodied; and Figure 2 is a top plan view of this structure.

Figure 3 is a vertical longitudinal sectional view at line 3—3 of Fig. 2.

Figure 4 is a front end elevation of the baby carriage or baby bouncer.

Figure 5 is a detail vertical sectional view at line 5—5 of Fig. 3; and Figure 6 is a similar view at line 6—6 of Fig. 3.

In the preferred form of the invention I utilize a base 1, which is here shown as a horizontal rectangular board forming the body of the baby carriage or bouncer, that is equipped with four wheels 2 which are journaled on longitudinally spaced and transversely arranged axles 3.

At the rear end of the base an upwardly and rearwardly extending handle bar 4 is fitted within a socket 5, and this bar, which is provided with a cross bar or handle 6, may be detached from the base for converting the carriage into a baby bouncer for amusement and exercise of the baby.

The resilient bouncing element is a leaf spring 7 of arched or bowed shape mounted longitudinally over the center of the base, with a front fulcrum bend 8 that terminates in an end attaching plate 9 that is secured to the base by bolts or screws 10.

At the rear end of the leaf spring a board seat 11 is fastened by bolts or screws 12, and the seat is equipped with a hook as 13 that coacts with an eye 14 screwed into the handle bar 4, to provide a detachable fastening for the spring when the appliance is used as a carriage, and from which the removable handle bar 4 is detached when the appliance is to be used as a baby bouncer.

The seat 11 is shown as equipped with a chair back 15, and of course the occupant of the chair straddles the leaf spring in position to rest his or her feet on the base board 1.

For convenience of the occupant of the chair an upright transversely arranged U-shaped yoke 16 is located in front of the seat and provided with a hand rail 17 the ends of which are secured as by screws 18 to the yoke. The flat base bar 19 of the yoke is rigidly mounted on the top of the base board 1 by means of a block 20 and bolts 21, and the handle rail may be used as an aid for a child in climbing into or out of the chair, as well as for providing a support for a carrier in which articles may be deposited for transportation.

As here shown the detachable article carrier is a wire basket 22 that is equipped with spaced hooks 23 at its upper rear edge for engagement with the cross bar or hand rail 17 of the yoke, and the basket is provided with a back bar or cross brace 24 that contacts with the arms of the yoke for stabilizing the suspended and detachable carrier.

Due to the simplicity in construction and operation of the appliance the detachable and removable parts may readily be manipulated with a minimum expenditure of time and labor, and then the appliance may be employed as a baby bouncer, with the occupant sitting in the freely suspended chair, grasping the hand rail, and with the feet on the base, for a bouncing movement on the leaf spring.

Having thus fully described my invention, what I claim as new and desire to secure by Letters Patent is:

1. The combination in a four wheel baby carriage having a horizontal base, and a rear upwardly extending handle bar, of a longitudinally extending and arched leaf spring having a front fulcrum bend and means for rigidly fastening the front end of the spring to the base, a seat rigidly mounted on the rear end of the spring, handle supporting means fixed to the base in front of the seat, a handle fixed to the upper end of said supporting means and detachable means for fastening the seat to the handle bar.

2. In a baby carriage as described, the combination with a horizontal base, and a rear upwardly extending handle bar mounted on the base, of a longitudinally extending leaf spring having its front fulcrum end attached to the base, a seat rigidly mounted on the rear end of the spring, handle supporting means fixed to the base in front of the seat, a handle fixed to the upper end of said supporting means and a coacting hook and eye uniting the seat with the handle bar.

3. In a baby carriage as described, the combination with a horizontal base, and a rear upwardly extending handle bar rigid with the base, of a longitudinally extending leaf spring having its front fulcrum end attached to the base and a seat on its rear end, detachable means for fastening the seat to the handle bar, a transversely arranged U-shaped yoke mounted on the base in front of the seat, and a horizontal hand rail uniting the upper ends of the yoke.

4. In a baby carriage as described the combination with a horizontal base and a rear upwardly extending handle bar rigid therewith, of a longitudinally extending leaf spring having its front fulcrum end attached to the base and a seat on its rear end, detachable means for fastening the seat to the handle bar, a transversely arranged U-shape yoke mounted on the base in front of the seat and a hand rail uniting the upper ends of the yoke, a removable carrier basket, and suspending hooks on said basket for coaction with the hand rail.

5. In a convertible appliance as described, the combination with a horizontal base having a removable rear upwardly extending handle bar, of a longitudinally extending leaf spring having its front fulcrum end attached to the base and a seat mounted on its rear end, detachable means fastening the seat to the handle bar, a transversely arranged U-shaped yoke mounted on the base in front of the seat, and a hand rail uniting the ends of the yoke.

JAMES ALFRED WOODS.

REFERENCES CITED

The following references are of record in the file of this patent:

UNITED STATES PATENTS

| Number | Name | Date |
|---|---|---|
| 1,915,234 | Maqusin | June 20, 1933 |
| 2,427,550 | Collura | Sept. 16, 1947 |